United States Patent
Williams et al.

(10) Patent No.: US 9,868,389 B2
(45) Date of Patent: *Jan. 16, 2018

(54) VEHICLE STATE INDICATION SYSTEM

(71) Applicant: Nissan North America, Inc., Franklin, TN (US)

(72) Inventors: Blair Williams, Fremont, CA (US); Melissa Cefkin, San Jose, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,372

(22) Filed: Sep. 30, 2015

(65) Prior Publication Data

US 2017/0088040 A1 Mar. 30, 2017

(51) Int. Cl.
  *B60Q 1/50* (2006.01)

(52) U.S. Cl.
  CPC ..................... *B60Q 1/50* (2013.01)

(58) Field of Classification Search
  CPC .......... B60Q 1/22; B60Q 1/26; B60Q 1/1207; B60Q 1/44; B60Q 1/46; B60Q 1/444; B60Q 1/50; B60Q 1/503; B60Q 1/506
  USPC ....................................................... 340/463
  See application file for complete search history.

(56) References Cited

U.S. PATENT DOCUMENTS

| | | | |
|---|---|---|---|
| 5,463,370 A | 10/1995 | Ishikawa et al. | |
| 5,663,707 A | 9/1997 | Bartilucci | |
| 7,095,318 B1 * | 8/2006 | Bekhor | B60Q 1/503 340/464 |
| 7,449,998 B1 | 11/2008 | Au et al. | |
| 8,606,430 B2 * | 12/2013 | Seder | B60Q 1/268 340/425.5 |
| 8,917,171 B2 | 12/2014 | Anderson et al. | |
| 8,954,252 B1 | 2/2015 | Urmson et al. | |
| 9,196,164 B1 * | 11/2015 | Urmson | G08G 1/166 |
| 2006/0125616 A1 | 6/2006 | Song | |
| 2012/0072087 A1 | 3/2012 | Wu et al. | |
| 2014/0062685 A1 * | 3/2014 | Tamatsu | B60Q 5/005 340/425.5 |
| 2015/0127222 A1 | 5/2015 | Cunningham, III et al. | |
| 2015/0336502 A1 * | 11/2015 | Hillis | B60Q 1/26 701/23 |
| 2015/0346727 A1 * | 12/2015 | Ramanujam | B62D 15/0285 701/23 |

(Continued)

FOREIGN PATENT DOCUMENTS

| | | |
|---|---|---|
| EP | 2868527 A1 | 5/2015 |
| JP | 2005047494 A | 2/2005 |

(Continued)

OTHER PUBLICATIONS

US 8,914,212, 12/2014, Urmson et al. (withdrawn)

(Continued)

*Primary Examiner* — Omar Casillashernandez
(74) *Attorney, Agent, or Firm* — Global IP Counselors, LLP

(57) ABSTRACT

A vehicle state indication system includes a detection system and a text display. The detection system is configured to sense an external moving object. The text display is disposed on a vehicle so as to be capable of selectively externally indicating a first state of the vehicle and a second state of the vehicle in a forward direction of the vehicle.

11 Claims, 11 Drawing Sheets

(56) References Cited

U.S. PATENT DOCUMENTS

2016/0144867 A1* 5/2016 Delp .................... B60W 50/14
                                                        701/28
2016/0297490 A1* 10/2016 Containne ................. B62J 6/04

FOREIGN PATENT DOCUMENTS

| JP | 2008114639 A | 5/2008 |
| JP | 2015074301 A | 4/2015 |

OTHER PUBLICATIONS

International Search Report dated Dec. 20, 2016 in corresponding International Patent Application No. PCT/JP2016/077117, filed Sep. 14, 2016 (with English Translation of Categories of Cited Documents).

* cited by examiner

VEHICLE STATE INDICATION SYSTEM

BACKGROUND

Field of the Invention

The present invention generally relates to a vehicle state indication system. More specifically, the present invention relates to a vehicle state indication system that indicates the state or intent of a vehicle to an external observer, such a pedestrian or remote vehicle.

Background Information

Conventional vehicle state indication systems include indication systems that attempt to advise external observers of the intent of the driver of a vehicle. For example, many vehicles include brake lights to indicate the braking status of a vehicle and turn signal indicators to indicate the intent of the vehicle to turn a specific direction.

Additional systems can include a system that rearwardly indicates the vehicle Additional systems can include a system that rearwardly indicates the vehicle intent to remote vehicles positioned rearward of the vehicle. For example, these conventional systems may indicate via text that the vehicle is in a stopped state or in a slow forward state.

Other conventional systems can include an external light indicating the direction that pedestrians are detected by a perception system. The lights move around the vehicle as the pedestrians move. Interior lighting indicates where pedestrians are detected, for passengers inside the vehicle. Messages on outside of the car tell pedestrians to "please walk" or "stop".

SUMMARY

It has been discovered that in order to increase transparency and predictability around vehicles, in particular, autonomous vehicles, an improved vehicle state indication system is needed. This system should externally communicate the state of the vehicle to all possible interacting agents. Moreover, this system should encourage flexibility in interactions, based on inputs from the vehicle perception or sensor system, vehicle interaction history and vehicle to vehicle communication systems.

In view of the state of the known technology, one aspect of the present disclosure is to provide a vehicle state indication system. The vehicle state indication system includes a detection system and a text display. The detection system is configured to sense an external moving object. The text display is disposed on a vehicle so as to be capable of selectively externally indicating a first state of the vehicle and a second state of the vehicle in a forward direction of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
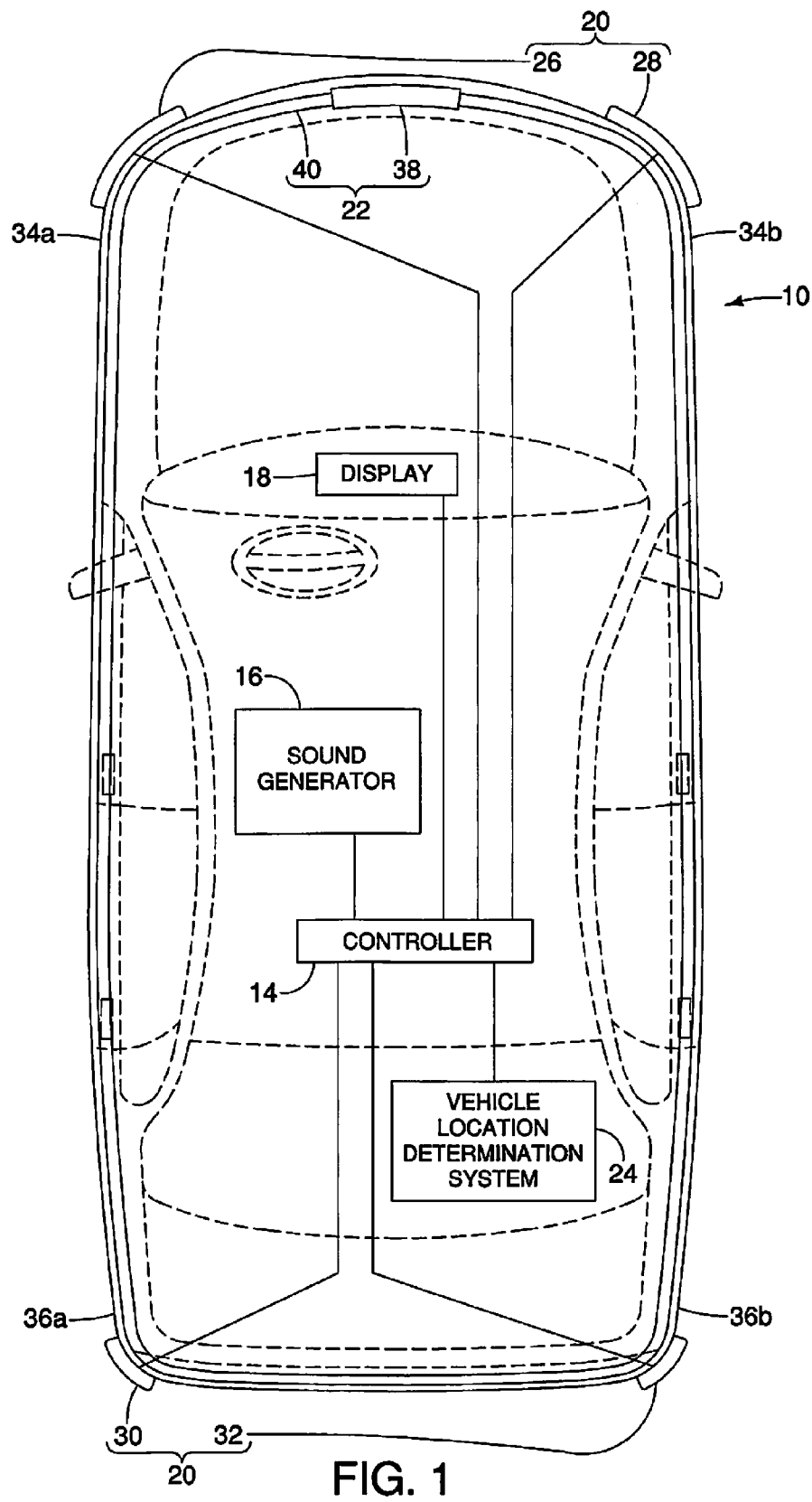
FIG. 1 is a schematic view of a vehicle with a vehicle state indication system according to one embodiment of the present invention.

Referring initially to FIG. 1, a vehicle 10 equipped with a vehicle state indication system 12 in accordance with a first embodiment is illustrated. The vehicle 10 is preferably an autonomous vehicle, but can be any suitable vehicle. The vehicle state indication system 12 has a plurality of modes (or on modes) that indicate the state of the vehicle to external objects P (such as pedestrians and remote vehicles).

Figure 2:
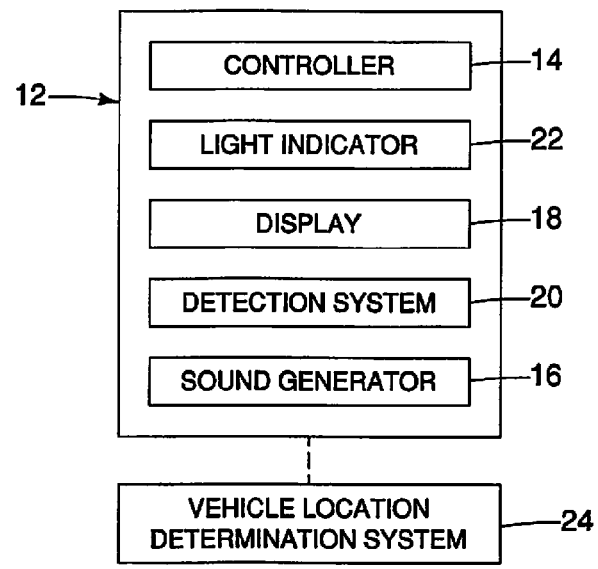
FIG. 2 is a schematic view of the vehicle state indication system shown in FIG. 1.

As shown in FIGS. 1 and 2 the vehicle state indication system 12 includes a controller 14, a sound generator 16, a display system 18, a detection system 20 and a light indication system (or light indicator) 22. Additionally, the vehicle state indication system 12 is in communication with a vehicle location determination system 24.

The controller 14 preferably includes a microcomputer with a control program that controls the vehicle state indication system 12 as discussed below. The controller 14 can also include other conventional components such as an input interface circuit, an output interface circuit, and storage devices, such as a ROM (Read Only Memory) device and a RAM (Random Access Memory) device. The microcomputer of the controller 14 is programmed to control one or more of the sound generator 16, the display system 18, the detection system 20 and the light indication system 22, and to make determinations or decisions, as discussed herein. The memory circuit stores processing results and control programs, such as ones for the sound generator 16, the display system 18, the detection system 20 and the light indication system 22 that are run by the processor circuit. The controller 14 is operatively coupled to the sound generator 16, the display system 18, the detection system 20 and the light indication system 22 in a conventional manner, as well as other electrical systems in the vehicle, such as the turn signals, windshield wipers, lights, any system or device necessary or desired for vehicle operation (autonomous or otherwise) and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the vehicle state indication system 12 in accordance with the control program. It will be apparent to those skilled in the art from this disclosure that the precise structure and algorithms for the controller 14 can be any combination of hardware and software that will carry out the functions of the present invention.

In one embodiment, the vehicle state indication system 12 can include a detection system 20. Preferably, the detection system includes a plurality of vehicle sensors 26, 28, 30, and 32 that are configured to detect a remote object in proximity to the vehicle. For example, as illustrated in FIG. 1, the remote vehicle sensors 26, 28, 30, and 32 are preferably mounted externally on the front quarter panels 34a and 34b and rear quarter panels 36a and 36b of the vehicle 10. However, the sensors 26, 28, 30, and 32 may be mounted on any suitable external portion of the vehicle 10, including the front and rear bumpers, the external mirrors or any combination of suitable areas. The sensors 26, 28, 30, and 32 transmit data to the positioning system 24, which is then capable of using the sensor data to calculate the position of the vehicle 10.

The vehicle sensors 26, 28, 30, and 32 can be any type of sensors desirable. For example, the front sensors can include a long-range radar device for object detection in front of the host vehicle. The front sensor may be configured to detect objects at a predetermined distance (e.g., distances up to 200 m), and thus may have a narrow field of view angle (e.g., around 15°). Due to the narrow field of view angle, the long range radar may not detect all objects in the front of the host vehicle. Thus, if desired, the front corner sensors can include short-range radar devices to assist in monitoring the region in front of the host vehicle. The rear sensors may include short-range radar devices to assist in monitoring oncoming traffic beside and behind the host vehicle. Placement of the aforementioned sensors permits monitoring of traffic flow including remote vehicles and other objects around the host vehicle, and the position of the vehicle 10 with respect to maintaining lane position or lane departure. However, the sensors 26, 28, 30, and 32 can be disposed in any position of the vehicle 10 and may include any type and/or combination of sensors to enable detection of remote objects. In addition, the sensors may be cameras, radar sensors, photo sensors or any combination thereof. Although FIG. 1 illustrates four sensors, 26, 28, 30, and 32 there can be as few or as many sensors as is desirable or suitable.

Although sensors 26, 28, 30, and 32 preferably are electronic detection devices that transmit electromagnetic waves (e.g., radar), these sensors can be any suitable sensors that, for example, take computer-processed images with a digital camera and analyze the images or emit lasers, as is known in the art. The sensors may be capable of detecting at least the speed, direction, yaw, acceleration and distance of the vehicle 10 relative to a remote object. Further, the sensors 26, 28, 30, and 32 may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles. The sensors are in communication with the controller 14 through position system 24, and are capable of transmitting information to the controller 14.

As illustrated in FIGS. 1-8, the vehicle state indication system 12 includes a light indication system 22. The light indication system 22 can include a lighting device 38 at least on the front 42 of the vehicle 10 and a light band 40 extending around the vehicle 10. Such a positioning of the lighting device 38 enables the vehicle 10 to clearly indicate intent to external objects P in front of the vehicle 10 (e.g., pedestrians or remote vehicles that the vehicle 10 is approaching). However, it is noted that the lighting device 38 can be disposed at any area of the vehicle 10 as desired or suitable.

The lighting device 38 is capable of emitting a plurality of colors in a plurality of positions. That is, the lighting device 38 can display a plurality of modes that indicate the state of the vehicle 10. For example, in one mode the light indication system 22 can display a red light indicating that the vehicle 10 is in an advancing state, and thus crossing in front of the vehicle 10 is not advised. In another mode, the light indication system 22 can display a yellow light, indicating that the vehicle 10 is in a transitioning state (i.e., a more passive state relative to the advancing state). Such an indication may occur as the vehicle 10 is slowing or yielding to pedestrians or other vehicles. The light indication system 22 can display a green light indicating that the vehicle 10 is in a stopping state, and thus crossing in front of the vehicle 10 is encouraged. In one embodiment, the light indication system 22 is capable of displaying five separate and distinct colors, each color representing a separate mode of the vehicle 10. That is, in addition to the three colors discussed above (red, yellow and green), the light indication system 22 can also display green-yellow to indicating a partially passive or yielding state and orange to indicate a more aggressive state than yellow but not as aggressive as red. Moreover, the light colors can be a continuous spectrum that changes dynamically between states. On the other hand, the light indication system 22 may simply be capable of displaying various colors to indicate the state of the vehicle 10. The colors discussed herein are merely used as an example, and the colors indicating the state of the vehicle can be any suitable or desired color. That is, in the above example, green indicates a waiting state, thus indicating that crossing in front of the vehicle 10 is encouraged. However, green may indicate an advancing state, and thus it is not advised to cross.

Thus, the light indication system 22 has a plurality of modes (or on modes) that indicate the state of the vehicle 10 to external objects P (such as pedestrians and remote vehicles). The plurality of modes are modes in which the light indication system 22 is "on", i.e., the lighting device is lit or the display is displaying text. Each of the plurality of modes can be different from each other mode.

As shown in FIGS. 4-8, the light band 40 can have portions 40a, 40b and 40c thereof light up. Thus, when an external object P, such as a pedestrian or remote vehicle, is sensed or detected by the detection system 20, the light band 40 can indicate the direction of the external object P. The light band 40 is generally connected to the sides 38a and 38b of the lighting device 38 at the front of the vehicle 10 and extends around (i.e., surrounds) or substantially around the vehicle 10.

Figure 4:
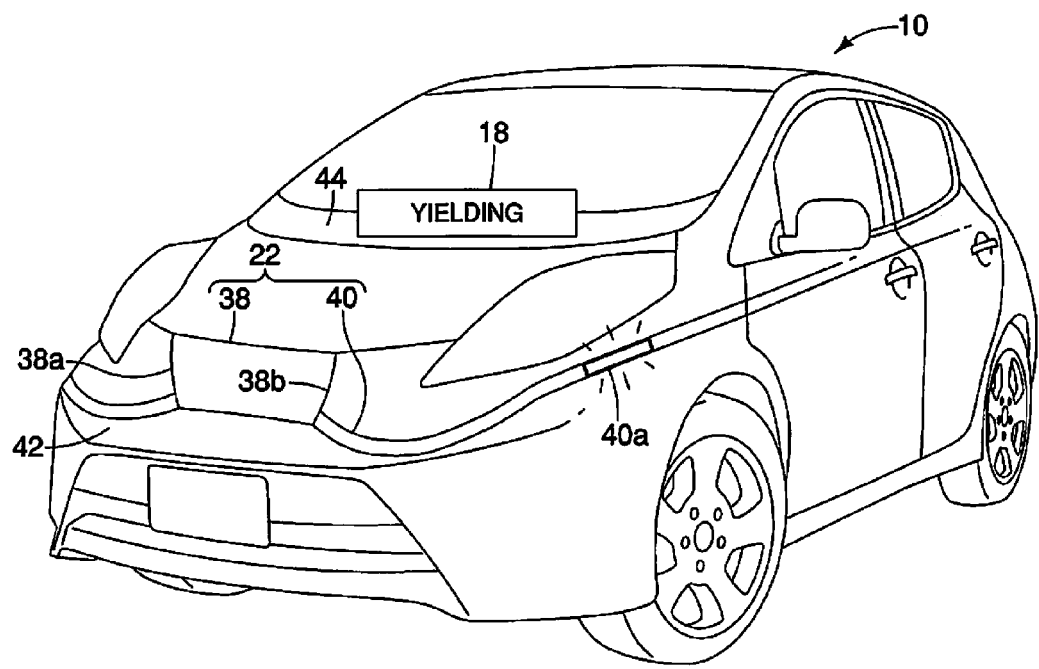
FIG. 4 is a front perspective view of an external display and light indicator for the vehicle state indication system shown in FIG. 3 indicating the direction of a pedestrian and a yielding status of the vehicle.
Figure 5:
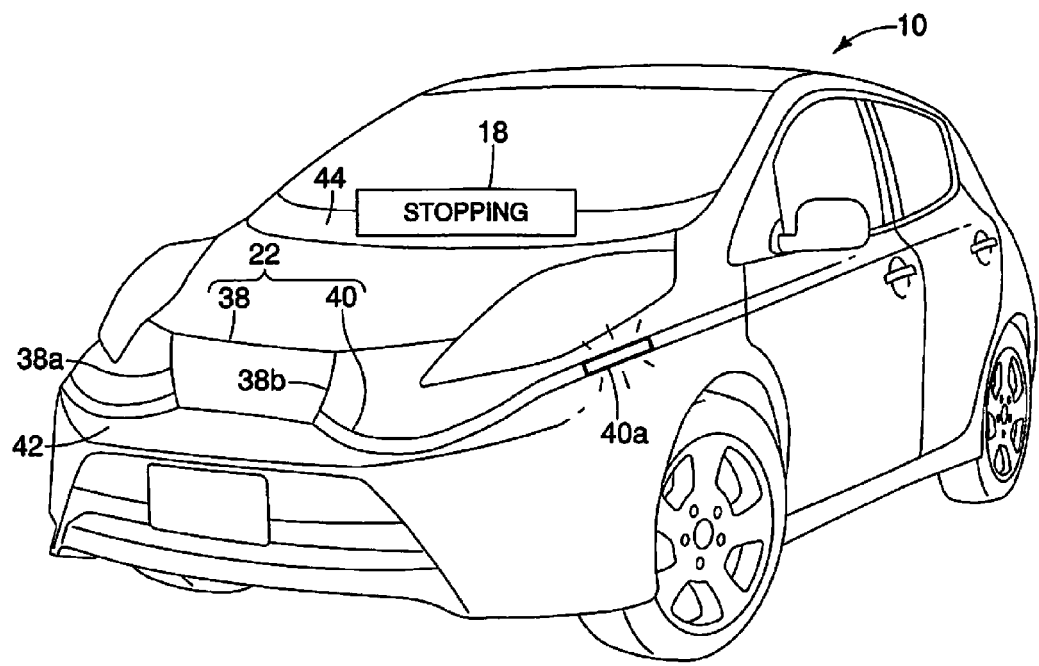
FIG. 5 is a front perspective view of an external display and light indicator for the vehicle state indication system shown in FIG. 3 indicating the direction of a pedestrian and a stopping status of the vehicle.
Figure 6:
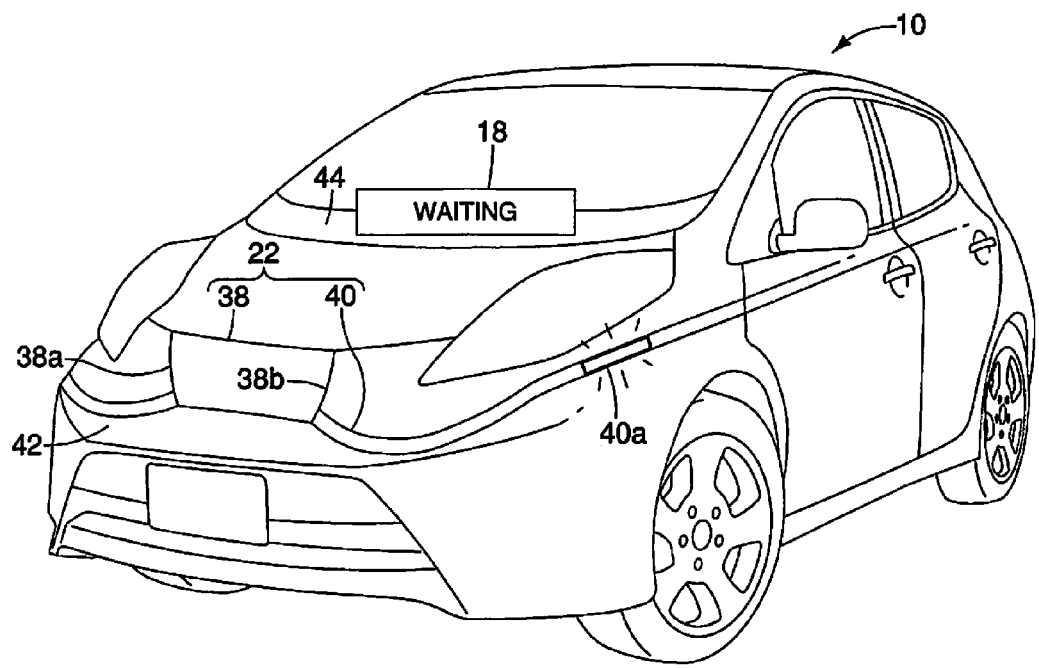
FIG. 6 is a front perspective view of an external display and light indicator for the vehicle state indication system shown in FIG. 3 indicating the direction of a pedestrian and a waiting status of the vehicle.
Figure 7:
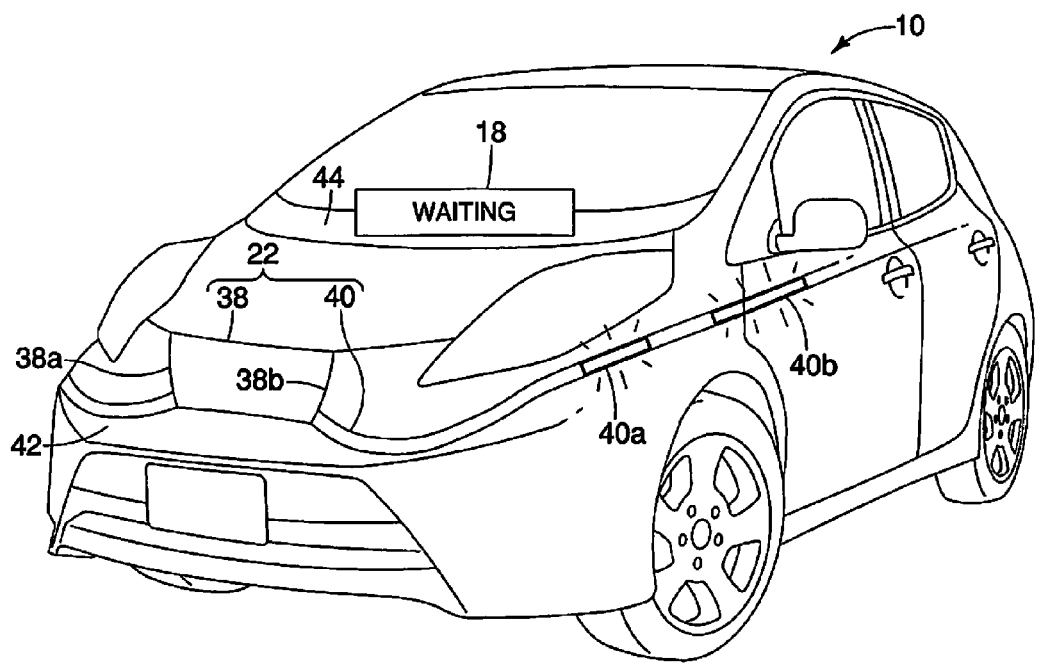
FIG. 7 is a front perspective view of an external display and light indicator for the vehicle state indication system shown in FIG. 3 indicating the direction of a multiple pedestrians and a waiting status of the vehicle.
Figure 8:
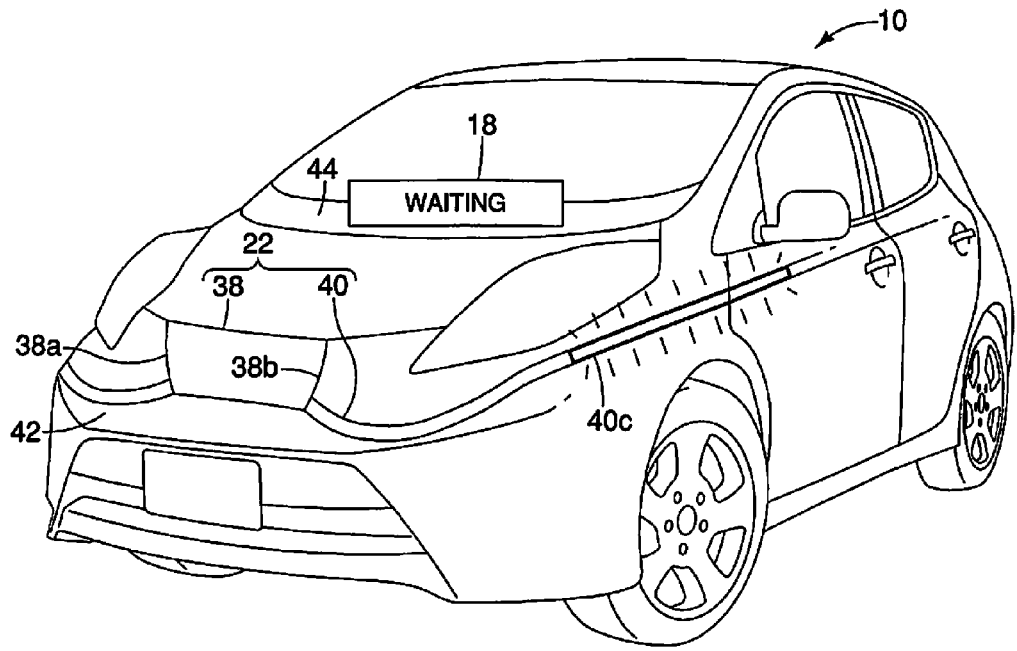
FIG. 8 is a front perspective view of an external display and light indicator for the vehicle state indication system shown in FIG. 3 indicating the direction of a group of pedestrians and a waiting status of the vehicle.

Thus, as shown in FIGS. 4-6, when an external object P is detected, the light band 40 indicates a portion (e.g., portion 40a) of the light band 40 in a direction of or adjacent to the external object P. Additionally, as shown in FIGS. 7 and 8, when multiple (or a plurality of) external objects are detected each object can be individually indicated (portions 40a and 40b) or when a large group is grouped together adjacent the vehicle 10, the light band 40 can indicate a large portion 40c in the direction of the group.

Furthermore, the light band 40 can indicate the state of the vehicle 10 using different modes. Thus, in one embodiment, similarly, to the lighting device 38, the light band 40 can display a plurality of modes that indicate the state of the vehicle 10. For example, in one mode the light band 40 can display a red light indicating that the vehicle 10 is in an advancing state, and thus crossing in front of the vehicle 10 is not advised. In another mode, the light band 40 can display a yellow light, indicating that the vehicle 10 is in a transitioning state (i.e., a more passive state relative to the advancing state). Such an indication may occur as the vehicle 10 is slowing or yielding to pedestrians or other vehicles. The light band 40 can display a green light indicating that the vehicle 10 is in a stopping state, and thus crossing in front of the vehicle 10 is encouraged. In one embodiment, the light band 40 is capable of displaying five separate and distinct colors, each color representing a separate mode of the vehicle 10. That is, in addition to the three colors discussed above (red, yellow and green), the light band 40 can also display green-yellow to indicating a partially passive or yielding state and orange to indicate a more aggressive state that yellow but not as aggressive as red. Moreover, the light colors can be a continuous spectrum that changes dynamically between states. The colors discussed herein are merely used as an example, and the colors indicating the state of the vehicle can be any suitable or desired color. That is, in the above example, green indicates a waiting state, thus indicating that crossing in front of the vehicle 10 is encouraged. However, green may indicate an advancing state, and thus it is not advised to cross.

The indication of the vehicle state is not limited to colors. That is, the indication of the present state of the vehicle 10 can be displayed in any suitable manner, including but not limited to a single color spectrum, a meter system, a brightness indicator, a numerical indicator, sound or in any other manner.

In one embodiment, the driver or user of the vehicle 10 can modify the interaction state bias. That is, the driver or the user of the vehicle 10 can adjust a setting in the vehicle 10 that would make the vehicle 10 yield priority more often or assume priority more often, as desirable. For example, the driver or user of the vehicle 10 can set the vehicle state indication system 12 to a passive bias, which can be correlated with leisurely driving and friendly behavior, i.e., the vehicle 10 will stop more and accelerate/brake slowly and smoothly. On the other hand, the driver or user of the vehicle 10 can set the vehicle state indication system 12 to an aggressive bias, which can be correlated with hurried driving and independent behavior, i.e., the vehicle 10 will get from A to B more quickly and accelerate/brake more intensely. Such settings may be a continuous spectrum between a passive bias and an aggressive bias, or have a plurality of settings, including but not limited to a passive bias and an aggressive bias.

Figure 3:
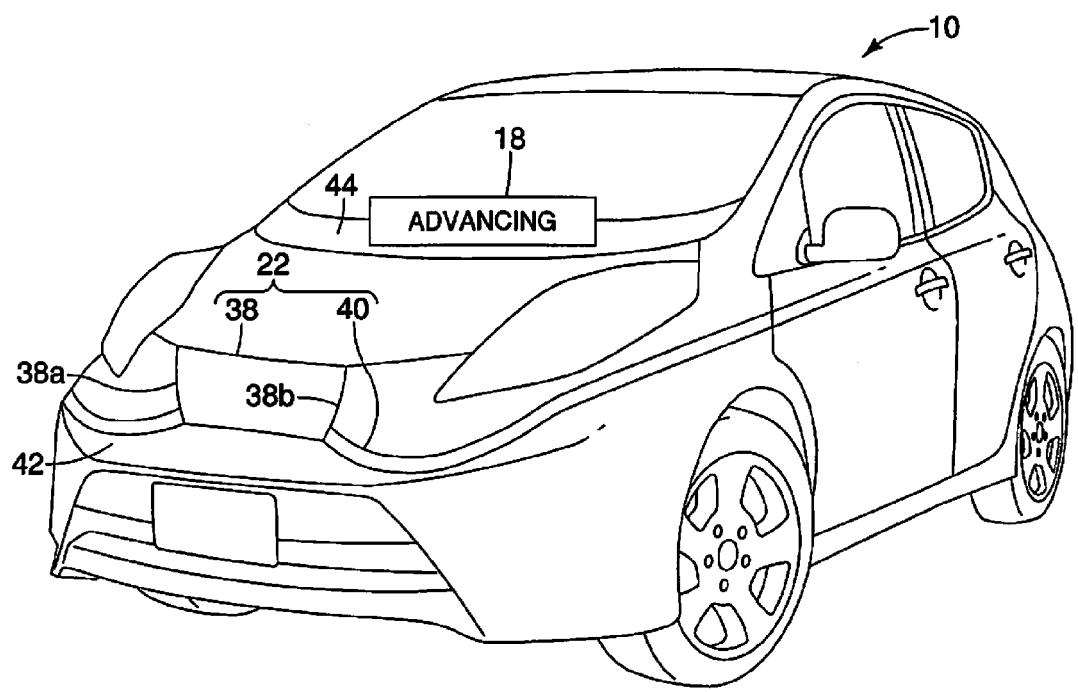
FIG. 3 is a front perspective view of an external display and light indicator for the vehicle state indication system shown in FIG. 1.

Additionally, the vehicle state indication system 12 includes a display 18. The display 18 is preferably a text display that is disposed on the vehicle 10 (e.g., the dashboard 44) so as to be capable of selectively externally indicating a first state of the vehicle 10 and a second state of the vehicle 10 in a forward direction of the vehicle 10. Thus, in one embodiment, similarly, to the lighting device 38, the display 18 can display, in text, a plurality of modes that indicate the state of the vehicle 10. For example, in one mode, as shown in FIG. 3, the display 18 can display "ADVANCING" indicating that the vehicle 10 is in an advancing state, and thus crossing in front of the vehicle 10 is not advised. In another mode, as shown in FIG. 4, the display 18 can display "YIELDING", indicating that the vehicle 10 is in a transitioning state (i.e., a more passive state relative to the advancing state). Such an indication may occur as the vehicle 10 is slowing or yielding to pedestrians or other vehicles. As shown in FIG. 5, the display 18 can display "STOPPING", indicating that the vehicle 10 is in a stopping state, and thus crossing in front of the vehicle 10 is encouraged. As shown in FIGS. 6-8, the display 18 can display "WAITING", indicating that the vehicle 10 is in a waiting state, and thus crossing in front of the vehicle 10 is encouraged.

As shown in FIGS. 1 and 2, the vehicle state indication system 12 preferably includes a sound generator 16 (such as a speaker or a plurality of speakers). The sound generator 16 can be in any suitable position within the vehicle 10 or may be externally mounted on the vehicle. For example, the sound generator 16 can be mounted to the interior doors or walls of vehicle 10 or mounted on the dashboard 44 or instrument panel, and is configured such that it will activate sound upon receiving a signal from the controller 14. The sound generator 16 may emanate sound from speakers used for other applications (e.g., the radio) or from a dedicated speaker. The sound generator 16 may work with the light indication system 22 and display 18 to provide information regarding the vehicle status to the vehicle 10 occupants and an external object P. That is, a sound generator 16 can provide a sound indicating the vehicle 10 is waiting for the external object P to cross in front of the vehicle 10, or that the vehicle 10 is preparing to advance or is advancing.

In another embodiment, the sound generator 16 can provide courteous feedback to the external object P to indicate that the vehicle 10 is aware of the external object crossing in front of the vehicle 10.

Moreover, as illustrated in FIGS. 1 and 2, the vehicle 10 includes a vehicle location determination system 24, such as a GPS, that is in communication with the vehicle state indication system 12. In one embodiment the vehicle 10 receives a GPS satellite signal. As is understood, the GPS processes the GPS satellite signal to determine positional information (such as location, speed, acceleration, yaw, and direction, just to name a few) of the vehicle 10. As noted herein, the positioning system is in communication with the controller 14, and is capable of transmitting such positional information regarding the vehicle 10 to the controller 14.

The vehicle location determination system 24 also can include a storage device that stores map data. Thus, in determining the position of the vehicle 10 using any of the herein described methods, devices or systems, the positioning of the vehicle 10 may be compared to the known data stored in the storage device. Thus, in one embodiment, the location determination system can determine when the vehicle is in proximity to a cross walk CW, a stop sign SS, an intersection I or any other area in which a remote vehicle or pedestrian (i.e., external object P) may cross near or in front or the vehicle 10. For example, the location determination system can determine when the vehicle is in proximity to a pedestrian that is crossing a street at an area other than a cross walk (i.e., jay-walking) and the vehicle state indication system 12 can communicate as described above. Also, the location determination system can identify signaling devices and structures other than stop signs such as stop lights (e.g., scenarios involving legally turning right on a red light), and the vehicle state indication system 12 can communicate intent accordingly. A remote vehicle can be any type of vehicle on the road, including but not limited to automobiles, trucks, bicycles, and any other vehicles.

Figure 9A:
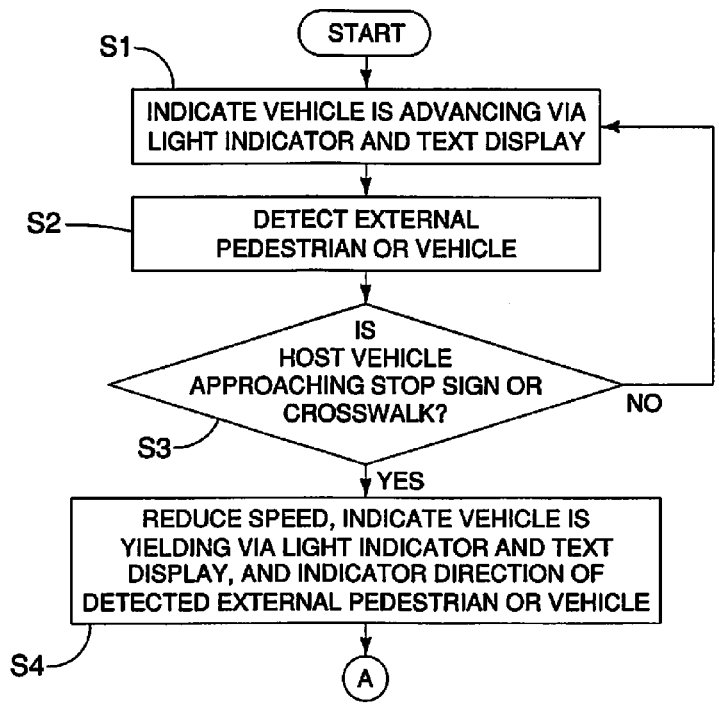
FIGS. 9A-9B are a flow chart illustrating the process of indicating the vehicle state of the vehicle state indication system.
Figure 9B:
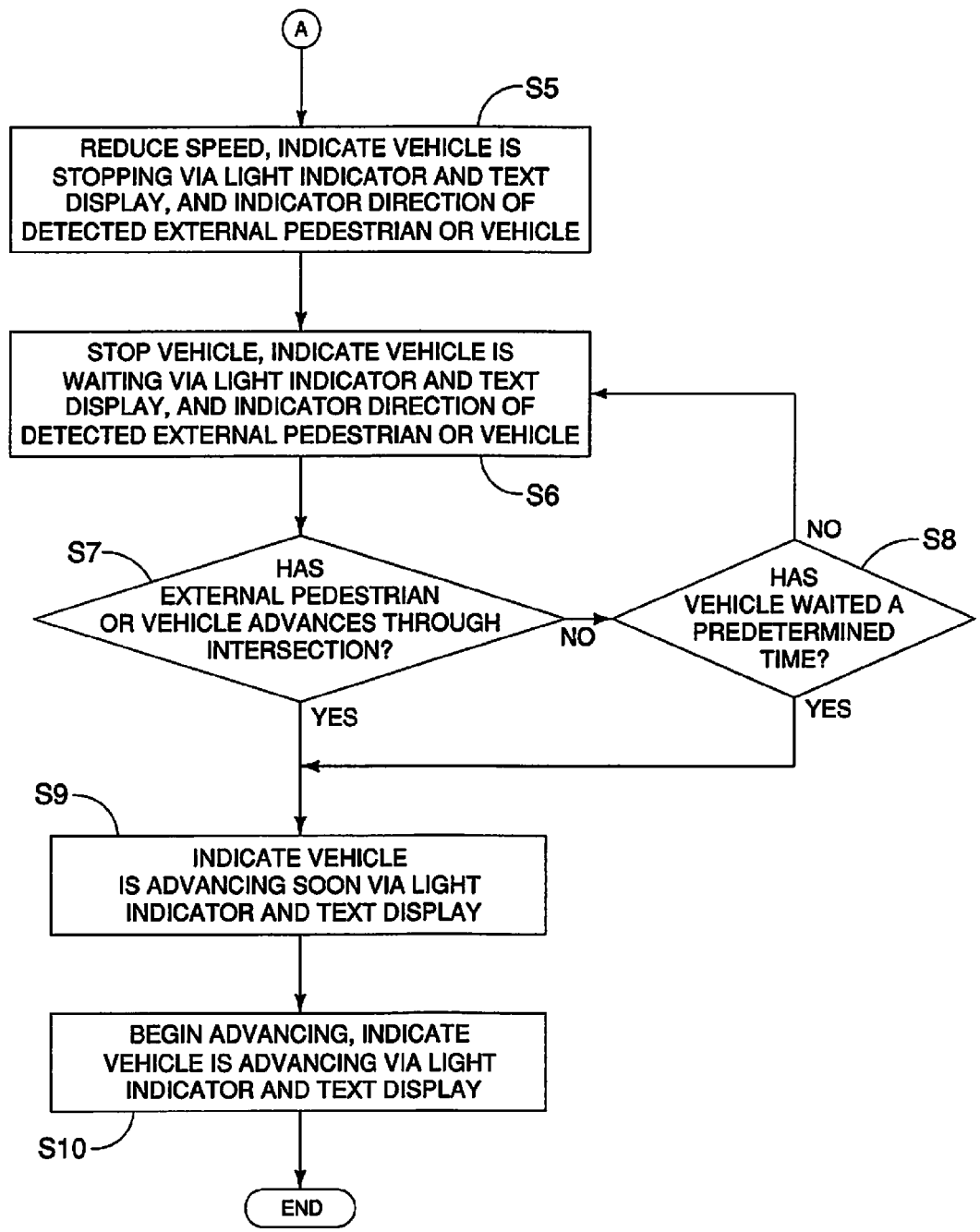
Figure 10:
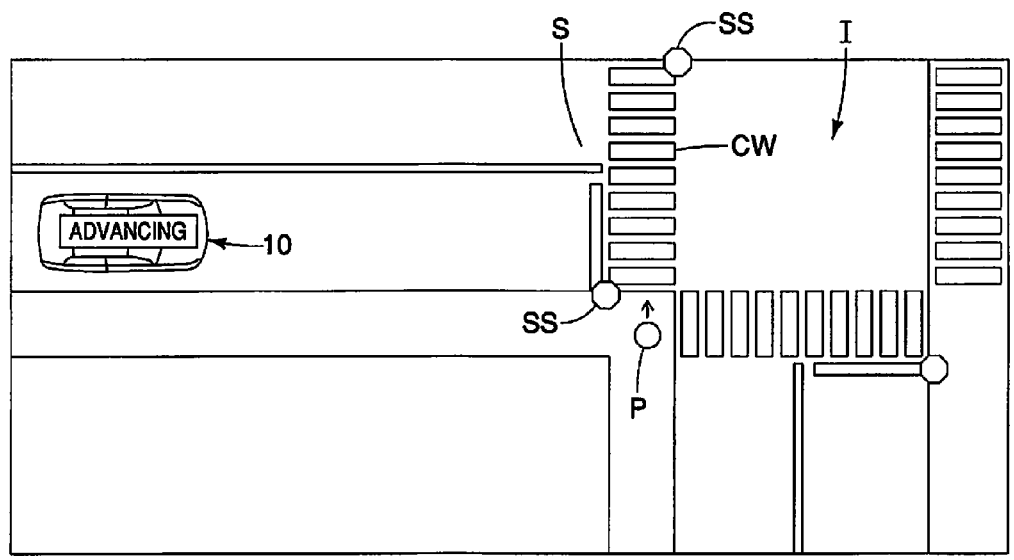
FIG. 10 is a schematic plan view of a vehicle equipped with the vehicle state indication system according to one embodiment approaching an intersection.

FIGS. 9A-9C illustrate the procedure in which the vehicle state indication system 12 determines the state of the vehicle 10 and the manner of communication to an external object P, such as a pedestrian or remote vehicle. First in step S1, the vehicle is in an advancing state. Thus, the lighting device 38 displays a red light and the display 18 displays the text "ADVANCING". The detection system then detects an external object P (e.g., a pedestrian or remote vehicle) in step S2. The vehicle location determination system 24 determines in step S3 whether the vehicle is approaching a crosswalk CW, stop sign SS or other area that would require yielding to the external object P. If none of these conditions exist, the vehicle state indication system 12 maintains all indications that the vehicle 10 is in an advancing state.

When the vehicle state indication system 12 determines that the vehicle 10 is approaching a crosswalk CW or stop sign SS, for example, the controller 14 determines that yielding is necessary. Thus, in step S4, the controller 14 causes the vehicle 10 to reduce speed, indicate via the lighting device 38 and display 18 that the vehicle 10 is in a yielding state. Moreover, the light band 40 indicates the direction of the sensed external object P. As the vehicle 10 continues to yield, the vehicle 10 further reduces speed to zero, and indicates that the vehicle 10 is in a stopping state in step S5 via the lighting device 38 and display 18 and indicates the direction of the external object P via the light band 40. Thus, the vehicle state indication system 12 through the light indication system 22 is configured to transition the lighting device 38 from one mode to another mode, while the detection system 20 detects the external moving object P.

In step S6, the vehicle 10 is stopped and indicates that the vehicle 10 is in a waiting state via the light indication system 22 and display 18 and indicates the direction of the external object P. In step S7, the controller 14 determines whether the external object P has advanced though the intersection I or crosswalk CW. If the external object P has not advanced though the intersection I or crosswalk CW, the controller 14 determines if the vehicle 10 has waited a predetermined amount of time for the external object P to cross in S8. If the vehicle 10 has not waited a predetermined amount of time, the vehicle 10 maintains the waiting step described in S6. However, if the vehicle 10 has waited a predetermined amount of time, or if the external object P has advanced though the intersection I or crosswalk CW, the lighting device 38 and display 18 indicate that the vehicle 10 is advancing soon in step S9. In step S10, the vehicle 10 then begins advancing and indicates the advancing state via the lighting device 38 and the display 18.

Figure 11:
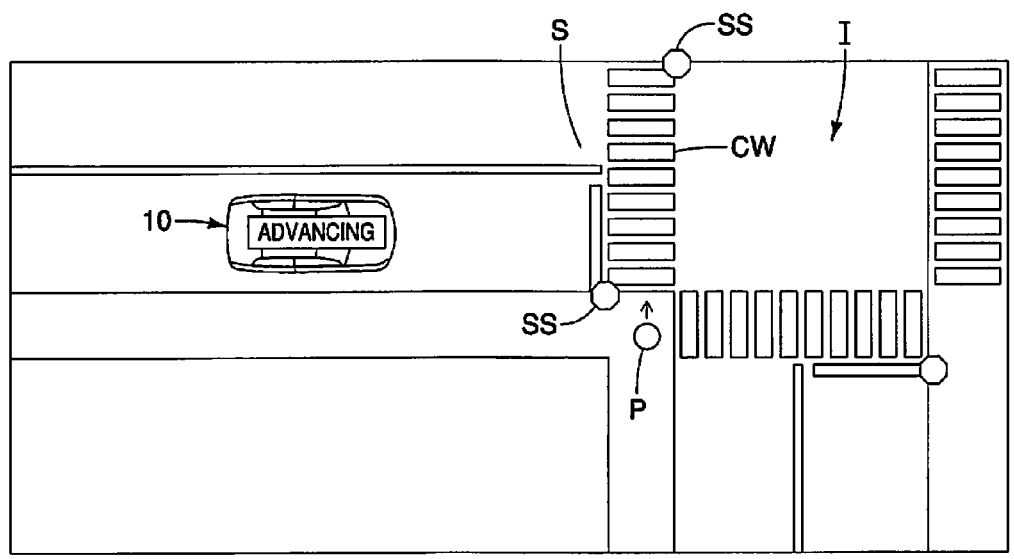
FIG. 11 is a schematic plan view of a vehicle equipped with the vehicle state indication system according to one embodiment approaching an intersection and sensing a pedestrian waiting at a crosswalk.
Figure 12:
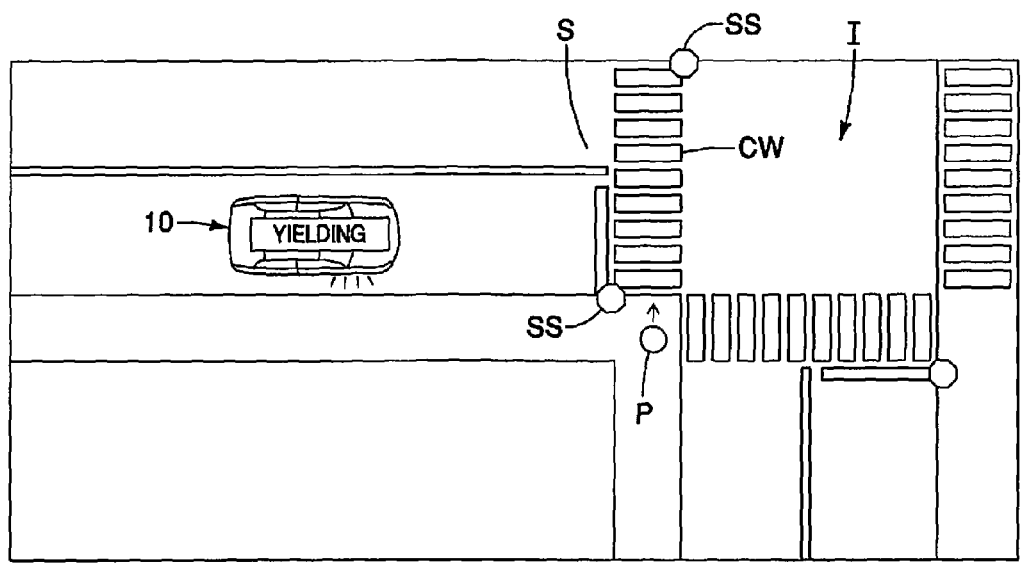
FIG. 12 is a schematic plan view of a vehicle equipped with the vehicle state indication system according to one embodiment approaching an intersection and slowing down and yielding to the pedestrian waiting at a crosswalk.

Turning to FIGS. 10-17, a vehicle 10 equipped with the vehicle state indication system 12 is shown. First, in FIG. 10, the vehicle 10 is shown approaching an intersection I that includes a stop sign SS and a crosswalk for pedestrians. As the vehicle 10 approaches the intersection I, the vehicle 10 indicates that it is in the advancing state. In FIG. 11, the detection system 20 detects the pedestrian (i.e., the external object P) waiting at the crosswalk CW. Additionally, the vehicle 10 can determine that a stop sign SS is present via the detection system 20 and/or the vehicle location determination system 24. The vehicle state indication system 12 then in FIG. 12, indicates the location of the pedestrian (i.e., the external object P) relative to the vehicle 10 via the light band 40 and that the vehicle 10 is entering a yielding state via the light indication system 22 and the display 18.

Figure 13:
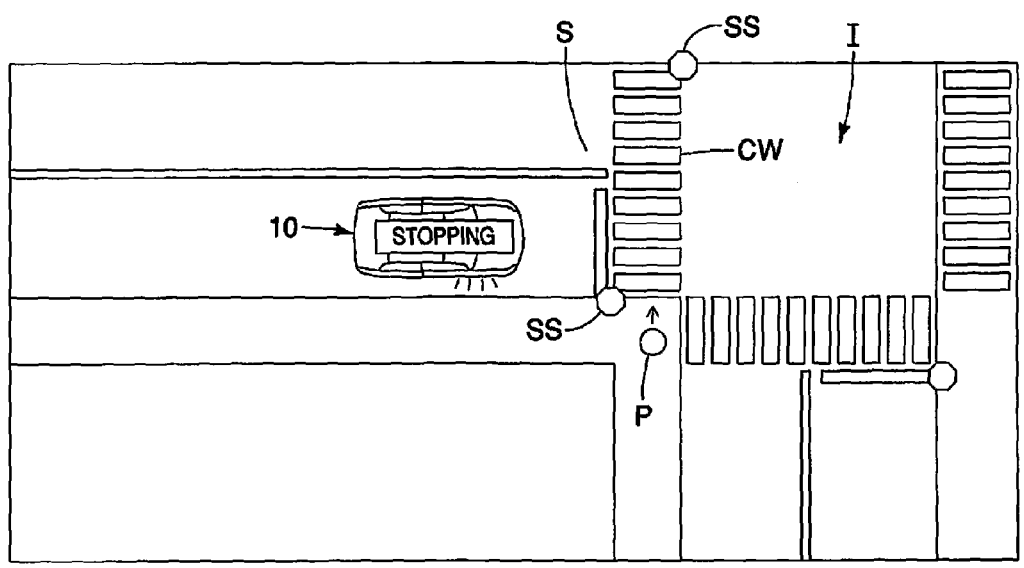
FIG. 13 is a schematic plan view of a vehicle equipped with the vehicle state indication system according to one embodiment approaching an intersection and stopping to allow the pedestrian waiting at a crosswalk to cross.
Figure 14:
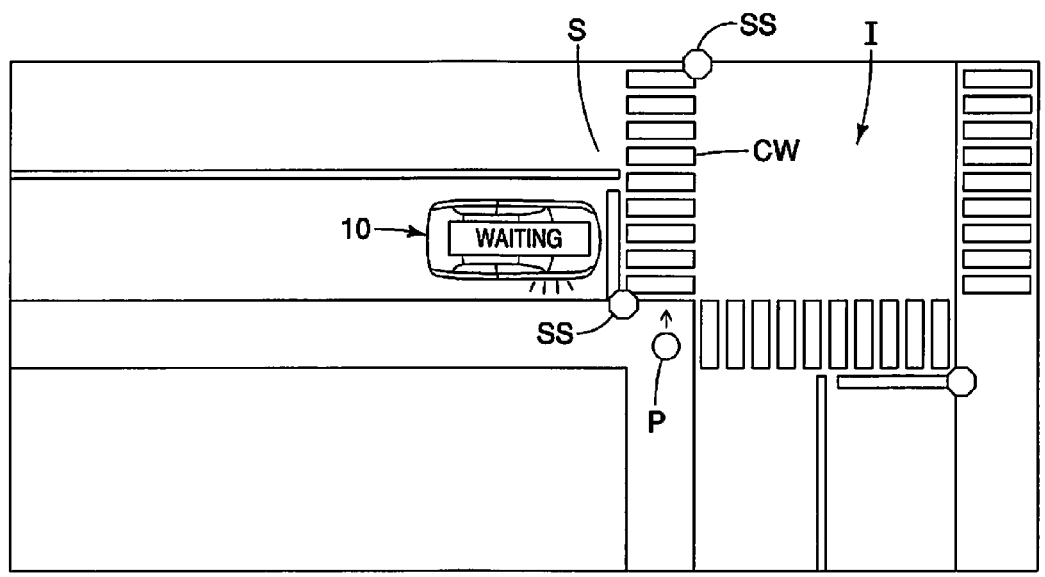
FIG. 14 is a schematic plan view of a vehicle equipped with the vehicle state indication system according to one embodiment stopped at an intersection and waiting for the pedestrian to cross.
Figure 15:
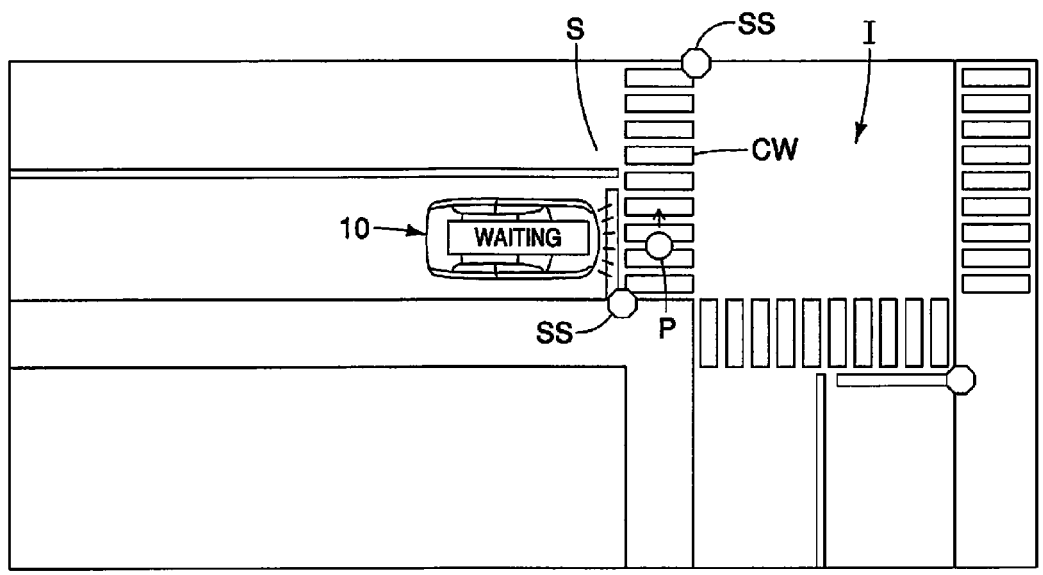
FIG. 15 is a schematic plan view of a vehicle equipped with the vehicle state indication system according to one embodiment stopped at an intersection and waiting for the pedestrian to complete crossing.
Figure 16:
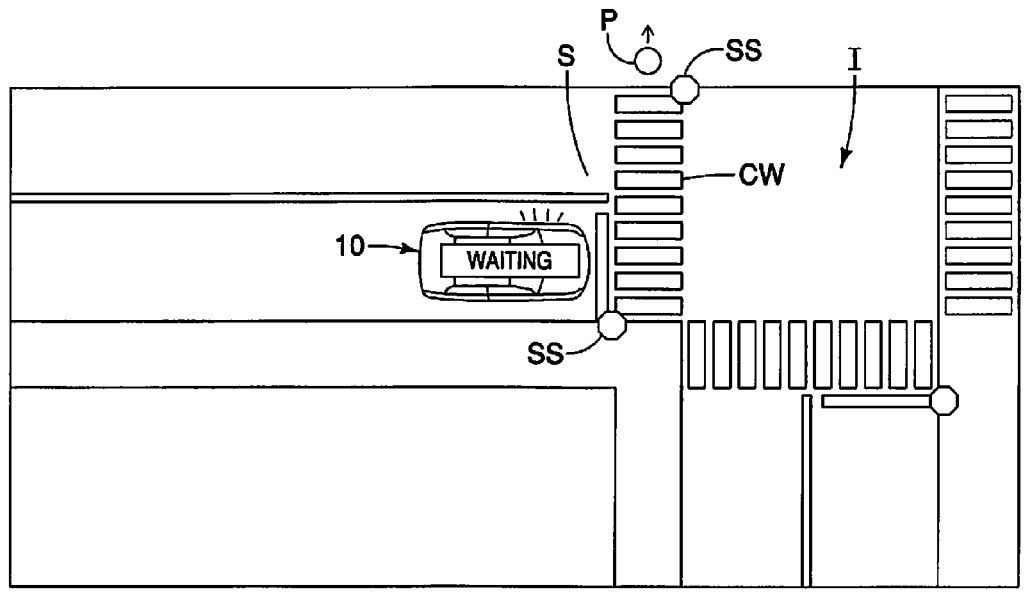
FIG. 16 is a schematic plan view of a vehicle equipped with the vehicle state indication system according to one embodiment stopped at an intersection and sensing that the pedestrian has completed crossing.
Figure 17:
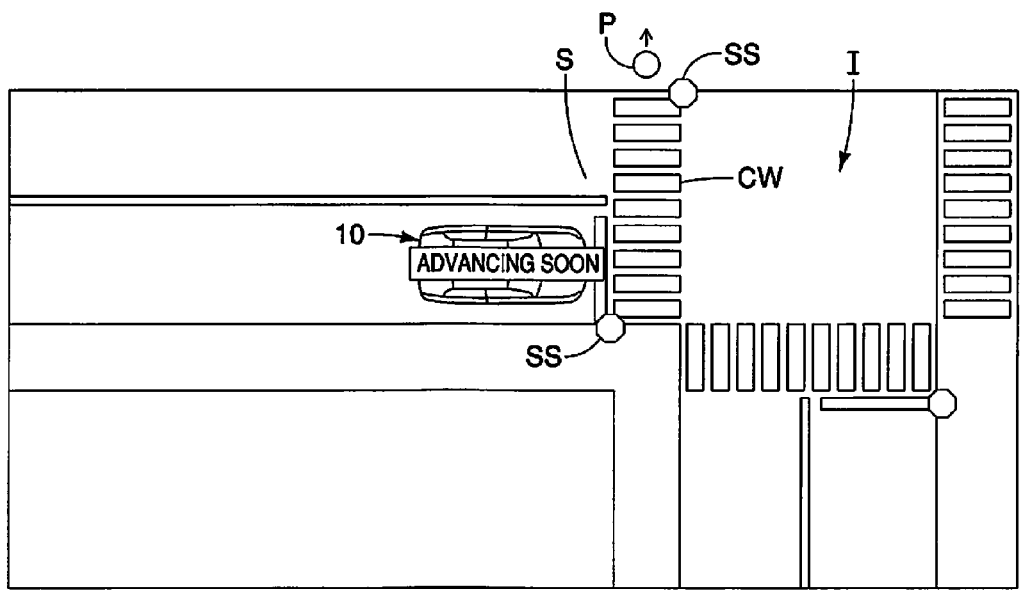
FIG. 17 is a schematic plan view of a vehicle equipped with the vehicle state indication system according to one embodiment stopped at an intersection and sensing that the pedestrian has completed crossing and indicating that the vehicle will advance soon.

As shown in FIG. 13, as the vehicle 10 approaches the crosswalk CW the vehicle 10 comes to a stop and indicates that the vehicle 10 is in a stopping state via the light indication system 22 and the display 18. As shown in FIG. 14, the vehicle 10 comes to a complete stop and indicates that the vehicle 10 is in a waiting state via the light indication system 22 and the display 18. As shown in FIG. 15, the detection system 20 monitors the pedestrian (i.e., the external object P) as the pedestrian crosses the street S in front of the vehicle 10. In FIG. 16, the pedestrian (i.e., the external object P) has completed the crossing, the light band 40 indicates the direction of the pedestrian, and in FIG. 17, the vehicle state indication system 12 indicates the vehicle 10 is advancing soon via the light indication system 22 and the display 18.

Figure 18:
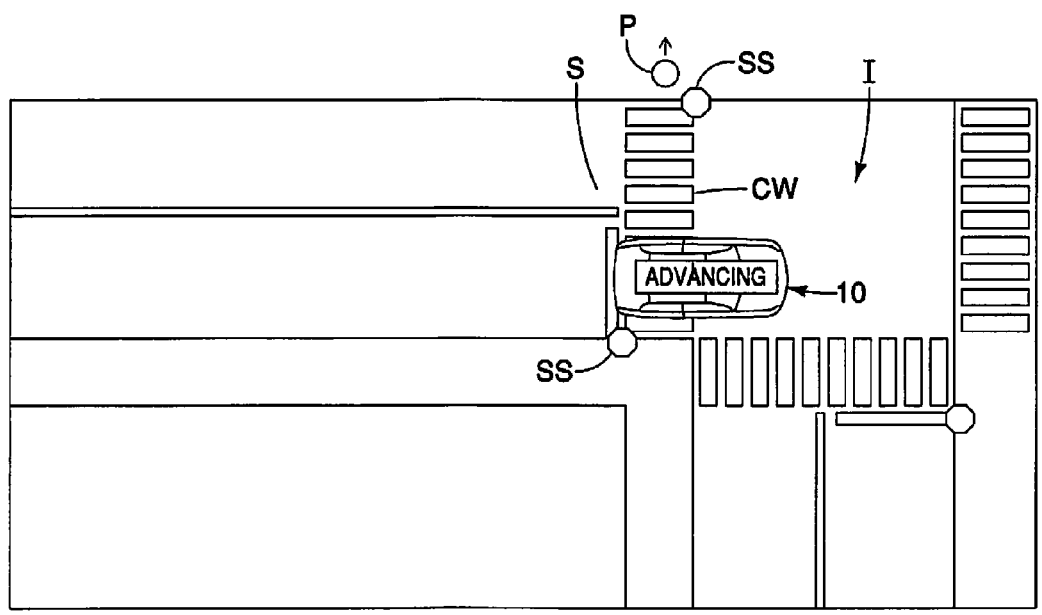
FIG. 18 is a schematic plan view of a vehicle equipped with the vehicle state indication system according to one embodiment advancing through the intersection.

In FIG. 18, the vehicle state indication system 12 indicates the vehicle 10 is advancing through the intersection I.

In one embodiment, if the pedestrian (i.e., the external object P) fails to cross the intersection I via the crosswalk CW or in any other manner, the detection system 20 can detect the continuous position of the pedestrian (i.e., the external object P). The controller 14 can infer from the lack of movement from the pedestrian (i.e., the external object P) that the pedestrian does not intend to cross. In such a situation, the controller 14 can then change the state of the vehicle to the advancing soon state described above (FIG. 17) and advance the vehicle 10 as described in conjunction with FIG. 18. In other words, the light indication system 20 is configured to transition from one mode (i.e., the waiting mode) to another mode (i.e., advancing or advancing soon mode) after a predetermined amount of time. Thus, the vehicle state indication system 12, using the detection system 20, is configured to determine the moving state of the external object P, and the controller 14 is programmed to determine whether the vehicle 10 intends to enter the first state or the second state, based on the moving state of the external moving object P.

Moreover, the detection system 20 can be capable of detecting hand signals or other indicators from the external object P. For example, the external object P may, in the case of a pedestrian, wave the vehicle 10 forward to indicate that the pedestrian intends to wait for the vehicle 10 to pass through the intersection. In the case of a remote vehicle, the vehicle may flash its lights or make another motion to indicate that the remote vehicle intends to wait for the vehicle 10 to pass through the intersection. The controller 14 can infer from the indication from the external object P that it is permissible to proceed. In such a situation, the controller 14 can then change the state of the vehicle 10 to the advancing soon state described above (FIG. 17) and advance the vehicle 10 as described in conjunction with FIG. 18.

Further, the external object P may indicate appreciation to the vehicle 10 for waiting. In such a situation, the detection system 20 can detect the external object P indication, and the vehicle state indication system 12 may display an appreciation text via the display 18 or make an appreciation sound through the sound generator 16.

The vehicle 10 can also indicate displeasure with the external object P. For example, in a situation in which the external object P abruptly changes direction or actions, such that the external object P interrupts a perceived travel opportunity or travel direction of the vehicle 10, the vehicle state indication system 12 may indicate displeasure using a text via the display 18, the light indication system 20, or make a displeasing sound (e.g., horn or screeching tires) through the sound generator 16.

The vehicle state indication system 12 described herein increases transparency and predictability around vehicles, in particular, autonomous vehicles. Moreover, this system externally communicates the state of the vehicle 10 to all possible interacting agents. Further, this system encourages flexibility in interactions, based on inputs from the vehicle perception or detection system, vehicle interaction history and vehicle to vehicle communication systems.

The vehicle location detection system is a conventional component that is well known in the art. Since vehicle location detection systems are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiments, the following directional terms "forward", "rearward", and "above", as well as any other similar directional terms refer to those directions of a vehicle equipped with the vehicle state indication system. Accordingly, these terms, as utilized to describe the present invention should be interpreted relative to a vehicle equipped with the vehicle state indication system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle state indication system, comprising:
a detection system configured to sense an external moving object;
a controller programed to determine a first state of the vehicle based on a first action of the external moving object detected, and further programmed to determine the second state of the vehicle based on a second action of the external moving object detected, subsequent to the first state, while the detection system detects the external moving object; and
a text display disposed on a vehicle and capable of externally indicating an intent to enter the first state of the vehicle based on the first action of the external moving object detected in a forward direction of the vehicle, and capable of externally indicating an intent to enter the second state of the vehicle after the second action of the external moving object is detected in a forward direction of the vehicle, and upon the controller determining that the external moving object has transitioned from the first action to the second action.

2. The vehicle state indication system according to claim 1, wherein
the text display is disposed on the dashboard of the vehicle.

3. The vehicle state indication system according to claim 1, wherein
the first state of the vehicle is a stopped state, and the second first state of the vehicle is an advancing state.

4. The vehicle state indication system according to claim 1, wherein
the vehicle state indication system is in communication with a vehicle location determination system, and when the vehicle location determination system determines that the vehicle is in proximity to a stop sign, the text display is configured to indicate the vehicle intends to enter a stopping state.

5. The vehicle state indication system according to claim 1, wherein
the vehicle state indication system is in communication with a vehicle location determination system, and when the vehicle location determination system determines that the vehicle is in proximity to a crosswalk, and the detection system determines a pedestrian is adjacent the crosswalk, the text display is configured to indicate that the vehicle intends to enter a stopping state.

6. The vehicle state indication system according to claim 1, wherein
the text display is configured to transition from the first state to a third state after a predetermined amount of time.

7. The vehicle state indication system according to claim 1, wherein
the text display is configured to transition from the first state to a third state after the detection system determines that the external moving object has reached a predetermined location.

8. The vehicle state indication system according to claim 1, wherein
the text display is configured to display a text message that corresponds to an external light message indicated by a light indicator.

9. The vehicle state indication system according to claim 1, wherein
the detection system is configured to determine a moving state of the external moving object, and the controller is programmed to determine whether the vehicle intends to enter the first state or the second state, based on the moving state of the external moving object.

10. A vehicle state indication system, comprising:
a detection system configured to sense an external moving object;
a controller programmed to determine the first state of the vehicle based on a first action of the external moving object detected, and further programmed to determine the second state of the vehicle based on a second action of the external moving object detected, subsequent to the first state, while the detection system detects the external moving object; and
a text display disposed on a vehicle so as to be capable of selectively externally indicating an intent to enter the first state of the vehicle in a forward direction of the vehicle based on the first action of the external moving object detected, and capable of externally indicating an intent to enter the second state of the vehicle after the second action of the external moving object is detected, and when it is determined that the second action of the external moving object is different from the first action of the external moving object.

11. A vehicle state indication system, comprising:
a detection system configured to sense an external moving object;
a text display disposed on a vehicle so as to be capable of selectively externally indicating a first state of the vehicle and a second state of the vehicle in a forward direction of the vehicle; and
a controller programed to determine the first state of the vehicle based on a first action of the external moving object detected, and cause the text display to indicate the first state of the vehicle, and further programmed to determine the second state of the vehicle based on a second action of the external moving object detected, subsequent to the first state, while the detection system detects the external moving object, and while the text display indicates the first state of the vehicle, and further programmed to cause the text display to indicate an intent to enter the second state of the vehicle after the second action of the external moving object detected, and cause the text display to indicate the vehicle intends to enter the second state of the vehicle by displaying advancing soon on the text display.

* * * * *